United States Patent [19]

Wolkovitch

[11] Patent Number: 5,046,684
[45] Date of Patent: Sep. 10, 1991

[54] AIRPLANE WITH BRACED WINGS AND PIVOTING PROPULSION DEVICES

[76] Inventor: Julian Wolkovitch, 28603 Trailriders Dr., Rancho Palos Verdes, Calif. 90274

[21] Appl. No.: 308,656

[22] Filed: Feb. 9, 1989

[51] Int. Cl.$^5$ .............................................. B64C 27/22
[52] U.S. Cl. ................................... 244/7 A; 244/7 R; 244/45 R
[58] Field of Search ................... 244/7 R, 7 A, 45 R, 244/6

[56] References Cited

U.S. PATENT DOCUMENTS

| | | | |
|---|---|---|---|
| 1,498,412 | 6/1924 | Whiteside | 244/7 R |
| 3,404,852 | 10/1968 | Sambell et al. | 244/7 A |
| 3,797,783 | 3/1974 | Kisovec | 244/7 A |
| 4,053,125 | 10/1977 | Ratony | 244/45 R |
| 4,146,199 | 3/1979 | Wenzel | 244/45 R |

Primary Examiner—Galen Barefoot
Assistant Examiner—Christopher P. Ellis
Attorney, Agent, or Firm—Ashen, Martin, Seldon, Lippman & Scillieri

[57] ABSTRACT

Conventional cantilever wings of a tiltrotor aircraft are replaced by a joined-wing configuration that eliminates some major speed-limiting constraints of prior tiltrotor configurations—thereby allowing operation into the intermediate speed range of roughly 350 to 450 knots. Joined wings offer relatively rigid, stiffened support for the additional wing-mounted hardware, and also stiffen the system to resist rotor flutter and other sources of aggravated loading, that are characteristic of tiltrotor craft. Joined wings provide this advantage, however, while simultaneously significantly *lowering* airfoil thickness—and thereby importantly increasing the drag divergence Mach number, and hence the maximum speed. In addition, some joined-wing configurations have significantly lower rotor-wing downwash interactions in hover.

20 Claims, 5 Drawing Sheets

AIRPLANE WITH BRACED WINGS AND PIVOTING PROPULSION DEVICES

BACKGROUND

1. Field of the Invention

This invention relates generally to VTOL aircraft; and more particularly to tiltrotor aircraft for operation in the intermediate-speed range near 400 knots.

2. Prior Art

This section will review prior work in two fields that have not been interrelated heretofore:

(a) the history and current problems of tiltrotor aircraft; and (b) jointed-wing aircraft theory and test results.

(a) CANTILEVER TILTROTORS—Tiltrotor aircraft which have flown successfully include the little-known 1954 Transcendental Model 1G. Lambermont, P.; and Pirie, A., *Helicopters and Autogyros of the World, Second Ed.*, A. S. Barnes and Co., Cranbury, N.J. 08512 (1970).

Other such craft include the Bell XV-3, which first flew in 1955, and the Bell XV-15. At the time of writing, the Bell-Boeing V-22 Osprey and the Bell-Boeing Pointer RPV are nearing their first flights. All these craft alike are beset by five major problems, which will be set forth shortly.

The XV-3 and Model 1G employed tilting rotor shafts, the powerplant being fixed within the fuselage. The Pointer uses a similar arrangement, but has nacelle-like fairings around the rotor shafts.

Figure 19:
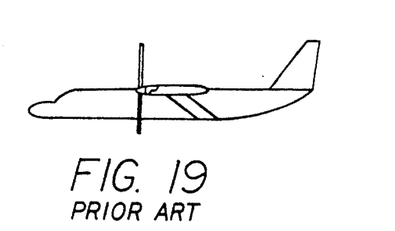
FIG. 19 is a side elevation of a prior-art tiltrotor aircraft with tilting rotor shafts—oriented for forward flight.
Figure 20:
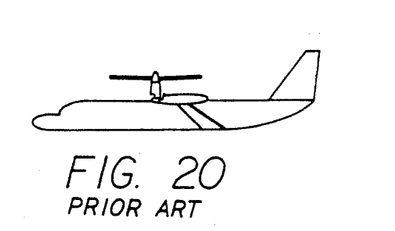
FIG. 20 is a like view of the same craft with the shafts oriented for hovering flight.

The XV-15 and V-22 instead have powerplants mounted in the nacelles to tilt with the rotor. It is also possible to have nontilting powerplants: FIGS. 19 and 20 show a powerplant in a fixed wingtip nacelle driving a tilting shaft.

According to *Aviation Week*, the United States Government has ordered 688 V-22s—for a total cost of $23.7 billion. Shifrin, C. A., in "Bell/Boeing Team Rolls Out V-22 Osprey Tiltrotor Prototype," 1988 *Aviation Week* 19-20 (May 30).

This is an immense investment, which may influence subsequent tiltrotor designs (both civil and military) to copy certain features of the V-22. Therefore in the analysis that shortly follows I shall pay special attention to some specific problems of the V-22.

Meanwhile, the strength of interest in civil applications has been noted in Kocks, K., "A U.S. Civil Tiltrotor: Is the Gauntlet Thrown?", 1987 *Rotor and Wing International* 30-31 (June). This article states that European manufactures hve organized a five-nation program, called EUROFAR, to produce a competitor to a U.S. civil derivative of the V-22.

The same reference describes a current FAA/NASA/DOD study. Kocks observes that that study "already indicates that a tiltrotor can offer significant airport congestion relief and do it economically under a realistic scenario."

Problem 1: Thick Airfoils—The main advantage of the tiltrotor over the helicopter is speed. *Jane's All the World's Aircraft, 1986-87 Edition*, gives the XV-15 maximum level speed at 17,000 feet altitude as 332 knots (Mach 0.53). Tilt-fold rotors offer the potential for still higher cruising speeds.

A limiting factor, however, on realizing such high speeds is airfoil thickness, and consequent low drag divergence Mach numbers. Current tiltrotor aircraft *must* employ very thick airfoils, to obtain adequate wing stiffness for support of the rotors—and, where applicable, the powerplants.

The V-22 wing airfoil has a thickness/chord ratio of twenty-three percent—limiting practical operational speeds to less than 300 knots. Such thick airfoils prevent the tilt-rotor concept from achieving its high-speed potential.

For example, Johnson, Lau and Bowles show that at 400 knots V-22 wing and rotor compressibility effects would each absorb approximately ten percent of the total power. Johnson, W.; Lau, B. H.; and Bowles, J. V., "Calculated Performance, Stability, and Maneuverability of High Speed Tilting Proprotor Aircraft," 11 *Vertica* 317-39 (1987).

Using thinner airfoils at no change in weight (which is impossible in the prior art) would eliminate compressibility drag at 400 knots, reducing cruise power by approximately ten percent. Furthermore, eliminating wing compressibility drag with no structural weight penalty would save fuel.

Reduction in fuel weight for a given mission reduces hover thrust and power. This leads to reduced engine and transmission weight.

Thus the compounded effect of eliminating wing compressibility drag would be large. Johnson, Lau and Bowles state that it could lead to a reduction in gross weight of ten percent.

Problem 2: Hover Thrust Losses—Felker and Light show that the net hover thrust of tiltrotor aircraft is typically eleven percent less than the isolated thrust of the rotors at the given shaft power. Felker, F. F.; and Light, J. S., "Aerodynamic Interactions between a Wing and a Rotor in Hover," 1988 *J. American Helicopter Society* 53-61 (April).

Figure 21:
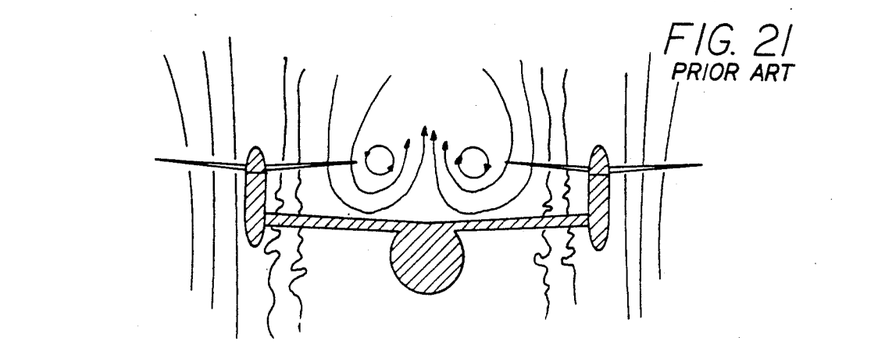
FIG. 21 is a highly diagrammatic front elevation of a prior-art tiltrotor aircraft in silhouette, together with adverse air-downwash effects in hover.

This thrust loss seriously degrades the load-carrying capability of the vehicle. It is caused by two phenomena, as illustrated in FIG. 21.

One is the direct drag (download) of the wings. The other is the recirculation fountain effect occurring near the aircraft plane of symmetry.

Problem 3: Aeroelastic Wing/Rotor Coupling—Aeroelastic problems of tiltrotor design are well known. Pylon/rotor whirl flutter avoidance requires careful tailoring of wing structural mode frequencies.

Attempts to resolve this problem by strengthening or otherwise stiffening the wing tend to aggrave the airfoil-thickness problem discussed above, as long as the wing is a cantilever type.

Problem 4: Tail Vibration—As described by Bilger, Marr and Zahedi, the horizontal and vertical tail assembly of the XV-15 experience severe oscillatory loads. At low speeds (twenty to fifty knots) the rotor tip vortices impact the tail, producing what those authors describe as a random "whipping" impulsive loading. Bilger, J. M.; Marr, R. L.; and Zahedi, A., "In-Flight Structural Dynamic Characteristics of the XV-15 Tilt-Rotor Research Aircraft," 19 *J. Aircraft* 1005-11 (November 1982).

Above fifty knots, with nacelle tilt angles greater than seventy degrees to the flight path, the effect of the rotor wake at the tail is primarily blade passage (three per revolution). At 110 to 130 knots the dominant tail excitation comes from the vortex shed from the wing-tip/nacelle junction.

At still higher speeds the oscillatory loading stems primarily from normal wing wake turbulence. All these variegated loading geometries—arising from varied rotor orientations that must be accepted as normal in a tiltrotor craft—once again call for structural reinforcements that are undesirable in terms of weight or drag penalty, or both.

Problem 5: Rotor-Wing Interference in Cruise—Current tiltrotors employ thick, large-chord wings having leading edges located only a short distance aft of the rotor (typically 0.25 times rotor radius). Thus each blade cycles through the wing upwash field at one per revolution.

This reduces propulsive efficiency and increases vibratory loads on the wing. The problem could be alleviated by moving the rotor further ahead of the wing, but this would require increasing rotor mast height (i.e., driveshaft length). For cantilever wings, such mast-height increase is undesirable because it tends to reduce the speed at which whirl flutter will occur.

Another drawback of short mast height, noted by Felker and Light, is that it increases the wing download in hover. Felker, F. F.; and Light, J. S., "Rotor/Wing Aerodynamic Interactions in Hover," *NASA TM* 88255 (May 1986; also presented at 1986 AHS Annual Forum).

They present test data showing that with a rotor located 0.217 times rotor radius R above a model V-22 wing the download was 0.14 times the rotor thrust T, whereas for greater mast height of 0.655R the net wing download was only 0.11T.

Felker and Light point out that this trend is not predicted by steady wake and slipstream contraction considerations. They ascribe it to large periodic airloads at the blade passage frequency.

Therefore short mast height also aggravates the vibration induced by such periodic loads. This provides another incentive to consider increasing mast height, but again whirl flutter would then set in at lower speed, thus limiting overall speed of the aircraft.

(b) JOINED-WING THEORY AND TESTS—The joined-wing airplane is a known type of aircraft configuration employing two sets of wings rigidly connected together to form a triangulated self-bracing structure.

Finite-element structural analyses and wind-tunnel tests have shown that, compared to cantilever-wing aircraft, joined-wing aircraft are lighter, stiffer, and have higher span-efficiency factors, giving lower induced drag. The joined wing also permits thinner airfoils to be used, thus increasing the Mach number for drag divergence and the maximum speed.

I have presented a complete survey of the joined wing in my paper, "The Joined Wing: An Overview," 23 *J. Aircraft* 161-78 (March 1986). Also informative are U.S. Pat. Nos. 3,942,747, 4,053,125, and 4,365,773. Therefore only the points of special interest to the present invention are listed here.

It has been shown that, compared to a conventional wing-plus-tail of the same span and total area made from the same material and carrying the same load, a joined wing can have these advantages:
(1) lighter by as much as forty-two percent;
(2) stiffer—for example, a twenty-six-percent increase in flutter speed;
(3) thinner-airfoil suitability, with less weight penalty;
(4) more span-efficient—for example, nine percent less induced drag; and
(5) better area-ruling, giving less transonic drag rise.

Eight different wind-tunnel models have been tested since 1979. No fundamental stability or control deficiencies have been found in any of those models. Limitations of the joined wing relate primarily to its novelty and design complexity.

For example, the small folded area (spotting factor) required for some shipboard deployments may demand complex wing-folding mechanisms. In addition, joined-wing craft are subject to Reynolds number reduction due to shorter wing chords.

Heretofore no relationship beween tiltrotor aircraft and joined-wing theory has been proposed or even suggested.

SUMMARY OF THE DISCLOSURE

My invention is a hybrid aircraft capable of vertical takeoff and highly efficient hovering flight, and of forward flight at intermediate speeds approaching roughly four hundred knots. The aircraft includes a fuselage.

The aircraft of my invention also includes some means for providing aerodynamic lift in forward flight at speeds approaching roughly four hundred knots. For purposes of generality and breadth in describing my invention, I shall refer to these means as the "self-bracing lift means" or simply the "lift means".

The lift means include, on each side of the fuselage, two wings:

a first wing, fixed at substantially the bottom of the fuselage, that is substantially unperforated in hovering as well as forward flight; and a second wing, fixed at substantially the top of the fuselage, or fixed to structure extending above the fuselage, and likewise substantially unperforated in hovering as well as forward flight.

On each side of the fuselage, at least one of these two wings has dihedral so that the wings converge to join or nearly join at their tips. The phrase "join or nearly join" is simply meant to encompass configurations in which the wings are joined through some relatively small intermediary element, of which examples will be introduced in the Detailed Description that follows.

The invention also includes some means for providing aerodynamic lift sufficient for highly efficient hovering flight, and for propelling the aircraft at speeds approaching roughly four hundred knots in forward flight. Again for generality and breadth, I shall call these means the "lift-and-propelling means".

These lift-and-propelling means include at least one unducted rotor, and are supported on the self-bracing lift means, at or near (on each side of the fuselage) the junction or near-junction of the first and second wings. The lift-and-propelling means are pivoted for operation in different orientations in hovering and forward flight respectively; and are of radius sufficient to extend, when pivoted for operation in forward flight, nearly to the fuselage.

The foregoing may represent a definition of my invention in one of its broadest or most general forms. In another of its most general or broad forms, the self-bracing lift means are for providing aerodynamic lift in forward flight at speeds approaching *but not exceeding* roughly four hundred knots. In this second broad form of my invention the unducted-rotor means are for propelling the aircraft at speeds similarly restricted.

A third of the broadest or most general forms of my invention is similar to the first except that it also includes engine means for driving the unducted-rotor means in rotation. In this third broad form of my invention, the self-bracing means support the engine means remote from the fuselage.

As will be appreciated, I prefer to practice these very broad forms of my invention in conjunction with additional characteristics or features. These further features maximize or optimize enjoyment of the benefits of the invention.

For example, these broadest forms or aspects of my invention are all generally compatible with one another. I prefer to practice them all in common, in a single apparatus.

As another kind of example, I prefer that the second wing be angled downward toward its tip; and that the lift-and-propelling means comprise rotor blades extending substantially radially from a driveshaft. In this same example, I further prefer that in hovering flight the rotor blades operate in rotation about axes that are angled, relative to the vertical, at an angle such that the blades are substantially parallel to the second wing.

As another example, particularly related to the above-mentioned third broad form of my invention: preferably the engine means are supported on the self-bracing lift-and-supporting means at or near the meeting or near-meeting of the wings—i.e., at or near their tips; and the engine means further are pivoted for operation in different orientations in hovering and forward flight respectively. More particularly I prefer that the lift-and-propelling means be mounted directly to the engine means, and include a driveshaft integral with or secured to an output shaft of the engine means.

As other examples I prefer to arrange a rotor-blade driveshaft in certain ways that depend upon whether the two wings are staggered or unstaggered, swept back or forward—or one forward and one back—and so forth.

I shall describe one such preferred arrangement in which at least one of the two wings is backswept toward its tip. In this preferred embodiment of my invention, the lift-and-propelling means comprise rotor blades extending substantially radially from a driveshaft, near an end of the driveshaft.

In this same backswept-wing embodiment, during forward flight the driveshaft is oriented substantially parallel to the direction of flight and is supported for rotation only at positions aft of the forwardmost portion of the "at least one" backswept wing. In this embodiment, the end of the driveshaft extends forward, from the positions at which the shaft is supported, far enough that:

the rotor blades clear the "at least one" backswept wing; and in forward flight, flapping vibration of the wings, induced by air backthrust from the blades, is significantly reduced.

In hovering flight, furthermore, due to that same extension of the end of the driveshaft from the positions at which the driveshaft is supported, flapping *down*load on the wings, induced by air downthrust from the blades, is significantly reduced.

As another example, I shall describe a preferred embodiment in which the wings are substantially unstaggered. In this embodiment the first of the two wings is fixed substantially directly below the second wing.

On account of this relationship the substantially unperforated second wing will partially shield the substantially unperforated first wing from rotor downwash during hovering flight. As a result, for the first and second wings considered together, the average downloading due to downwash in hover is significantly reduced.

As still another example, I shall describe a preferred embodiment in which the wings are staggered: the first wing is fixed forward of the second. The lift-and-propelling means include rotor blades extending substantially radially from a driveshaft, near an end of the driveshaft; and also include means for supporting the driveshaft for rotation.

In this staggered-wing embodiment, the driveshaft-supporting means are oriented in forward flight so that the driveshaft is substantially parallel to the direction of flight. In this preferred embodiment, the end of the drive-shaft extends forward from the driveshaft-supporting means, by a very short distance that is substantially only enough so that the rotor blades adequately clear the driveshaft-supporting means.

Still referring to the staggered-wing embodiment, each of the wings is swept slightly forward toward its tip. As a result the rotor blades also clear both wings—notwithstanding the shortness of the very short forward extension of the driveshaft.

In a related embodiment that is also preferred, the wings need not be swept forward—but neither wing is backswept toward its tip. The driveshaft end extends slightly forward, from the drive-shaft supporting means, far enough so that the rotor blades clear both wings, allowing for flapping of the blades—notwithstanding the fact that neither wing is backswept.

In a final example, I shall describe a second preferred embodiment in which the wings are staggered, the first wing being fixed forward of the second, and the first wing is slightly backswept toward its tip. The lift-and-propelling means include rotor blades extending substantially radially from a driveshaft, near an end of the driveshaft.

In forward flight, the driveshaft is oriented substantially parallel to the direction of flight and is supported for rotation only at positions aft of the forwardmost portion of said backswept first wing. The end of the driveshaft extends forward, from the positions at which the driveshaft is supported, so that the rotor blades clear the backswept first wing—even allowing for flapping of the rotor blades.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

In preferred embodiments my invention comprises replacing the cantilever wing of tiltrotor aircraft by a joined wing.

Remarkably, the joined wing eliminates or significantly mitigates all the above-noted tiltrotor problems, allowing a hundred-knot increase in air speed—and hence penetration into the intermediate speed range.

Thus this innovation will reduce weight, increase stiffness, reduce adverse downwash effects in hover, and increase maximum speed. The claimed combinations of the joined wing and the tiltrotor aircraft are new.

Joined wings allow thinner airfoils to be used, while maintaining required strength, weight and stiffness. Hence compressibility drag is reduced, and maximum speed increases.

The joined wing, being much stiffer than a cantilever, can tolerate increased mast height, and reap the benefits of reduced rotor-wing interference in cruise.

Certain joined-wing tiltrotor configurations replace the tail by a rear wing. This "integrated" arrangement eliminates all cantilever lifting surfaces.

It provides bracing for the vertical tail(s), and raises the rear wing out of the wing wake in cruise. I believe that this will reduce the amplitude of tail vibration.

In some configurations the joined wings can be superimposed so that in hover the lower wing is partially shielded from the rotor wake, and the net download on the wing system is reduced.

As shown in FIGS. 1 through 4, my invention has a fuselage 11 and may have a conventional tail assembly 20. It can be practiced with two staggered wings at each side of the fuselage—one wing 12 being fixed to the fuselage 11 forward of another wing 13.

The forward wing 12 is secured at the top of the fuselage and is generally horizontal; whereas the rear wing 13 is secured at the bottom (FIGS. 3 and 4) and slopes upward to meet the forward wing 12 at their tips. The two tips are connected together in a trailing configuration, as at a point 14; and the rotor masts or driveshafts are secured for tilting or pivoting operation near this same point 14.

Figure 1:
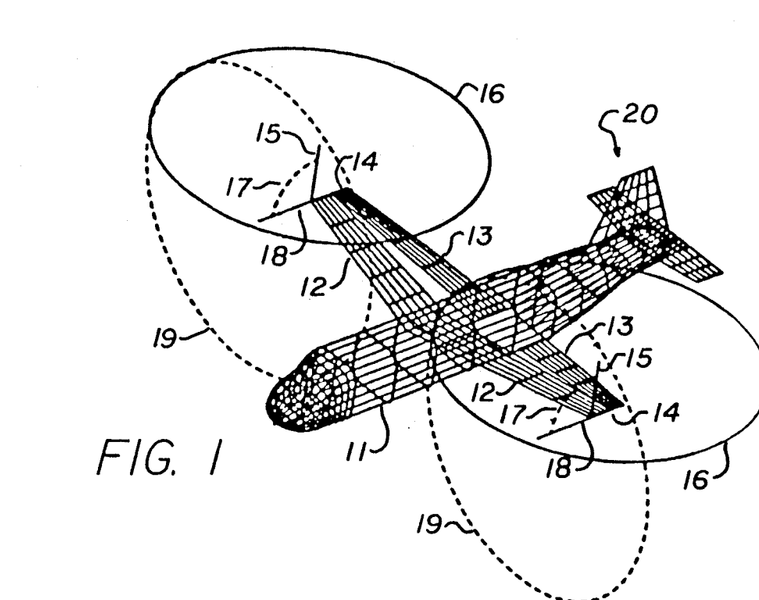
FIG. 1 is a highly schematic perspective view, of the transparent wire-frame type, showing an airframe in accordance with a first preferred embodiment of my invention. The drawing includes a representation of the rotors and booms (i.e., driveshafts) as oriented for hovering flight; and also includes in the broken line a representation of the same rotors and booms as oriented for forward flight.
Figure 2:
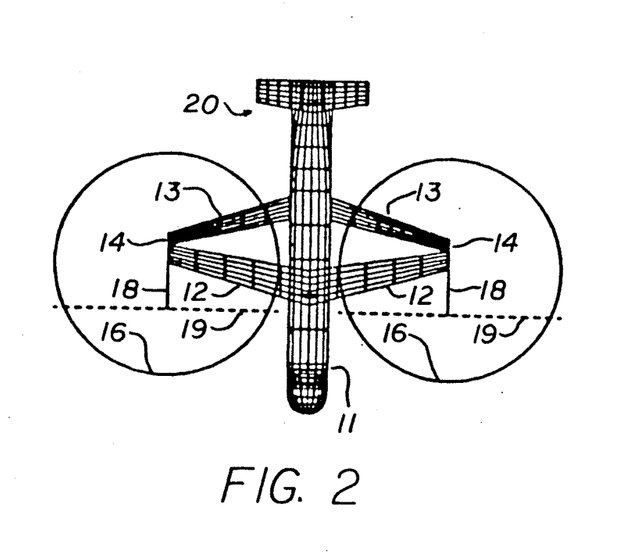
FIG. 2 is a similarly schematic top plan view, also of the transparent wire-frame type, showing the FIG. 1 embodiment. It likewise shows the rotors and booms in both hovering and forward-flight orientations.
Figure 3:
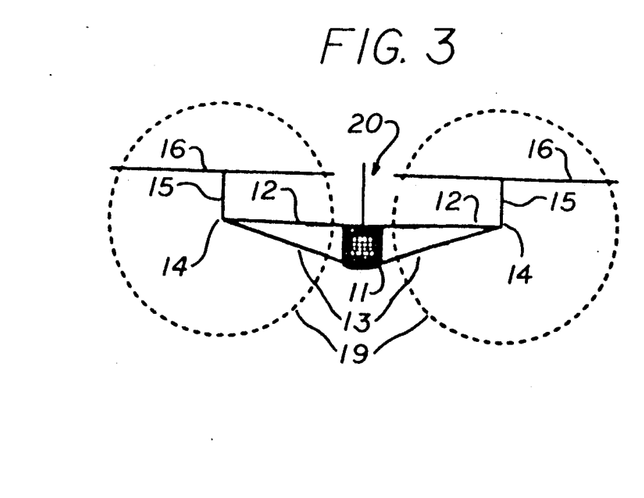
FIG. 3 is a similarly schematic front elevation, of the same transparent wire-frame type, showing the rotors and booms in both hovering and forward-flight orientations, of the same embodiment.
Figure 4:
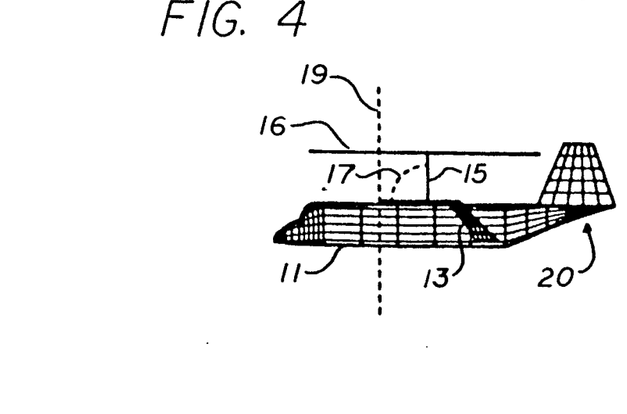
FIG. 4 is a like side elevation of the same embodiment.

For hovering operation the masts or driveshafts 15 are vertical; they support rotors whose tips rotate to describe generally horizontal circles 16 of FIGS. 1 and 2 (appearing as straight lines 16 in FIGS. 3 and 4). For forward flight the masts 15 are tilted or pivoted, along lines of motion 17, to the horizontal positions 18; in this orientation they support the same rotors—but now the rotor tips describe vertical circles 19 of FIG. 3 (straight lines 19 in FIGS. 2 and 4).

As can be immediately appreciated, the triangular shapes formed by the wing pairs and fuselage have very great intrinsic rigidity and stiffness, relative to conventional cantilever wings. Supporting the rotors at the outboard tips of these triangular shapes, as compared with cantilever wings, is thus inherently more favorable to absorbing the vibration and various air loadings developed by the rotors.

The same is true of supporting engines along the stiffened wings that form parts of these self-bracing triangles. The great weight and vibration of the engines are much more favorably handled by these braced structures, even if the engines are mounted near the tip positions 14—and in fact even if at such positions the engines are mounted to pivot with the rotor shafts.

FIG. 2 best shows that long rotor masts 18 can be used to prevent interference between the rotors 19 and forward wings 12 in forward flight. Relatively close spacing between the rotor tips and forward wings can be noted near the fuselage; this spacing is selected for adequate flapping clearance.

The great added vibration and air loading that arise from such long masts 18 are handled favorably by the inherent strength and stiffness or rigidity of the joined-wing configuration. This matching of strength and stiffness to loading makes this a viable configuration overall.

Furthermore, as seen in FIGS. 3 and 4 most clearly, in hovering mode the long masts 15 elevate the rotors well above the forward, higher wings 12. The result is to very greatly reduce the adverse effects of downwash in hover.

In FIGS. 5 through 18, components corresponding to those in FIGS. 1 through 4 have been given reference numerals that are the same as the reference numerals in those first four drawings—except for addition of a prefix "1", "2", "3" or "4" to distinguish the different embodiments. Thus for example the fuselage is 11 in FIGS. 1 through 4, it is 111 in FIGS. 5 through 8, it is 211 in FIGS. 9 through 12; etc.

FIGS. 5 through 8 show that my invention can be practiced with two substantially unstaggered wings, both swept slightly forward. Since my invention is particularly for operation at intermediate speeds, generally not exceeding 450 knots, some forward sweep can be tolerated.

Figure 6:
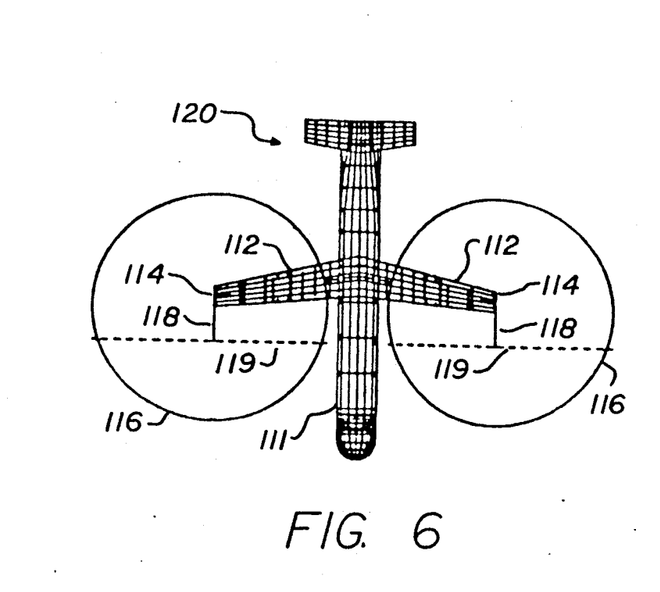
FIG. 6 is a plan view like FIG. 2, but showing the FIG. 5 embodiment.
Figure 7:
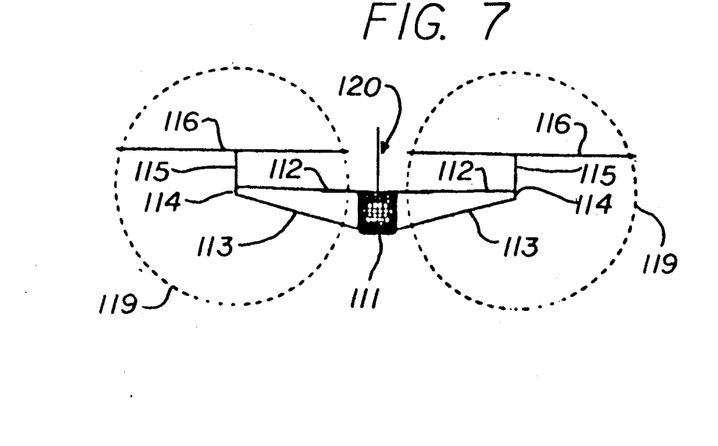
FIG. 7 is a front elevation like FIG. 3, but showing the same embodiment as FIGS. 5 and 6.
Figure 8:
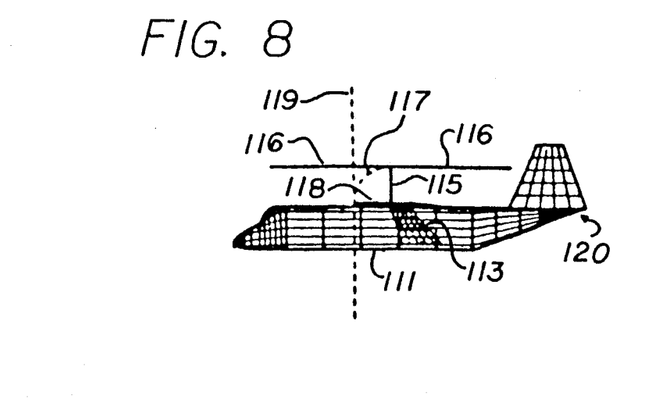
FIG. 8 is a side elevation like FIG. 4, but showing the same embodiment as FIGS. 5 through 7.
Figure 9:
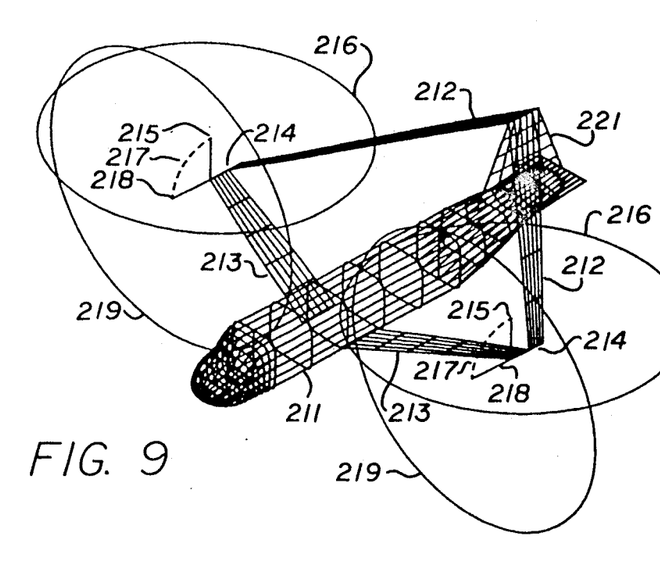
FIG. 9 is a perspective view like FIG. 1, but showing a third preferred embodiment.
Figure 10:
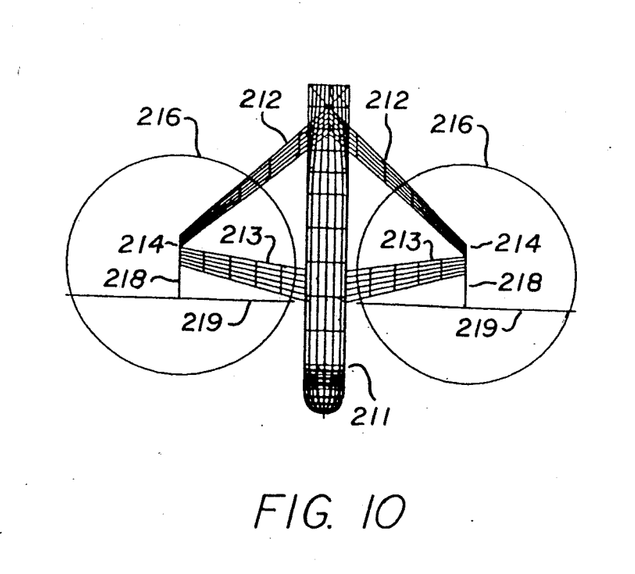
FIG. 10 is a top plan view like FIG. 2, but showing the FIG. 9 embodiment.

As seen in FIGS. 6 through 8, long rotor masts 115/118 if desired can be retained in this embodiment for their downwash-mitigating effects. This is the case even though (as FIG. 6 shows) more than adequate flapping clearance could be attained using very short masts, because of the forward-swept wings.

FIGS. 9 through 12 show that my invention can be practiced with integrated lifting surfaces. In particular the upper wings 212 in this embodiment of my invention are swept strongly forward from the rear of the craft, where they join the vertical tail 221 at its tip.

No separate horizontal tail is provided. The lower wing 213 is fixed to the bottom of the craft and is somewhat backswept, meeting the upper wing 212 at a point 214 near their tips in a trailing configuration analogous to that of FIGS. 1 through 4.

Figure 11:
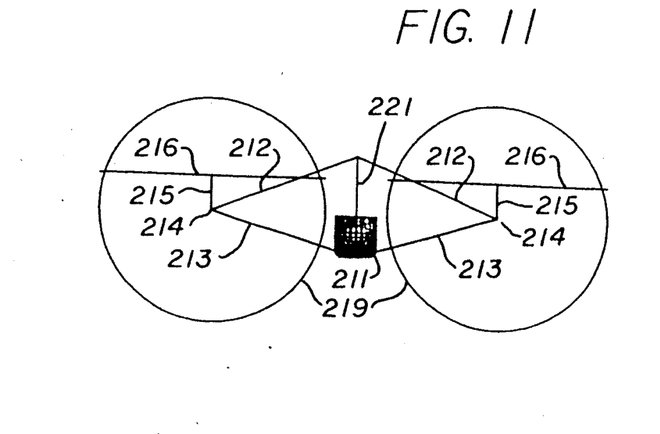
FIG. 11 is a front elevation like FIG. 3, but showing the same embodiment as FIGS. 9 and 10.
Figure 12:
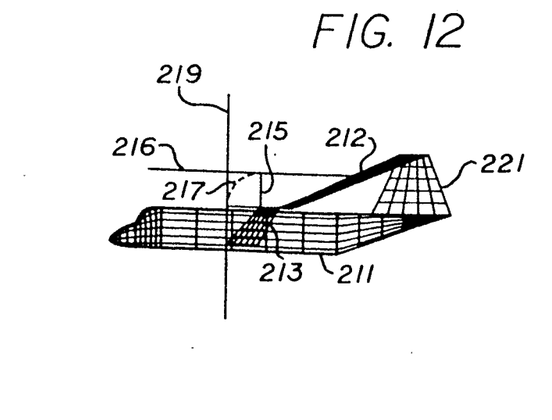
FIG. 12 is a side elevation like FIG. 4, but showing the same embodiment as FIGS. 9 through 11.
Figure 13:
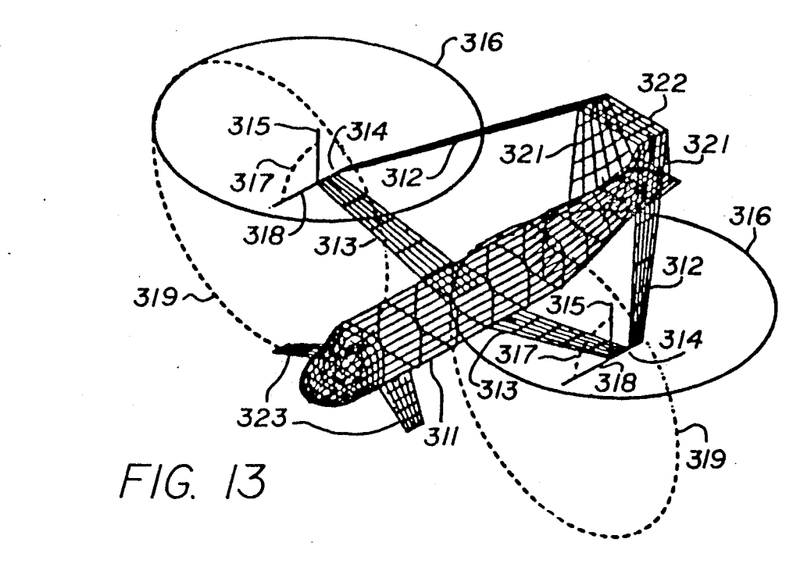
FIG. 13 is a perspective view like FIG. 1, but showing a fourth preferred embodiment.
Figure 14:
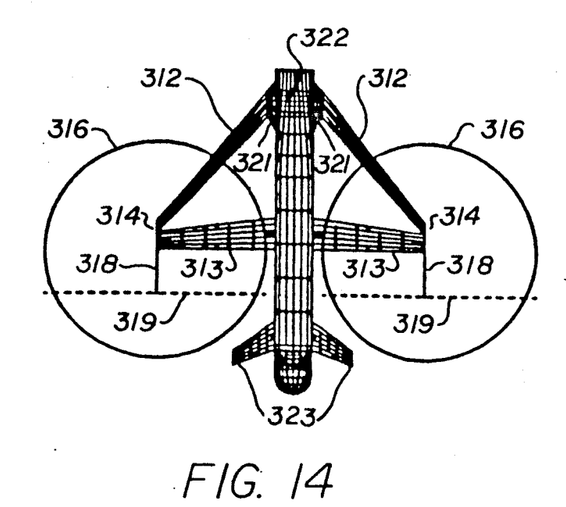
FIG. 14 is a plan view like FIG. 2, but showing the FIG. 13 embodiment.
Figure 15:
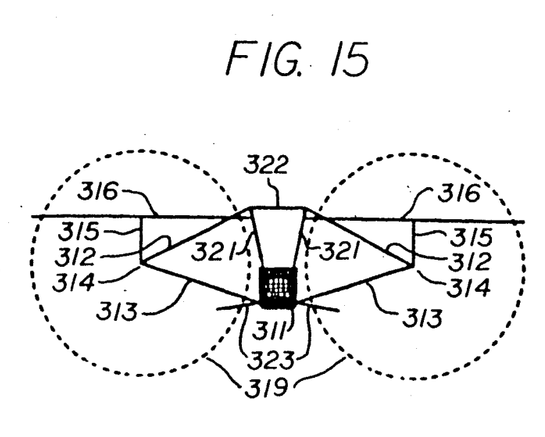
FIG. 15 is a front elevation like FIG. 3, but showing the embodiment of FIGS. 13 and 14.
Figure 16:
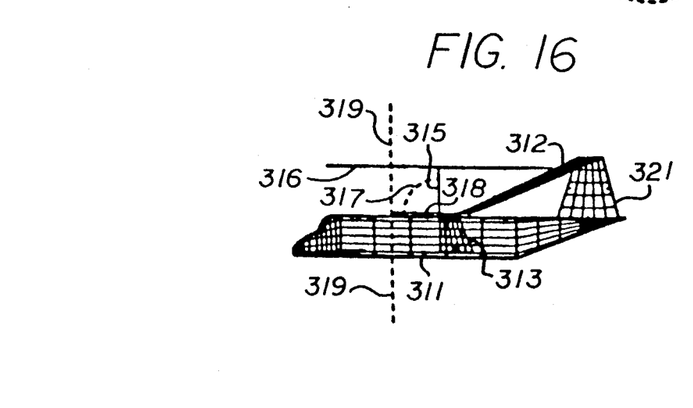
FIG. 16 is a side elevation like FIG. 4, but showing the same embodiment of FIGS. 13 through 15.

In this embodiment, mast length or height is once again significant for flapping clearance relative to the swept-back front wing 213; and also can be very significant for clearance of the highly elevated rear wings 212—as best suggested by FIGS. 11 and 12.

FIGS. 13 through 16 illustrate another embodiment with integrated lifting surfaces—this being one that includes a canard 323, as previously mentioned. Here twin fins 321 replace the single vertical tail 221 of FIGS. 9 through 12; and a short horizontal tail 322 spans or interconnects the tips of the two fins 321.

Each of the two upper, rear wings 312 joins a respective one of the two fins. Here as in the embodiment of FIGS. 9 through 12, mast height may again be important for rear-wing clearance, though the unswept front wing 313 presents little problem as to flapping clearance.

In combining tiltrotor and joined-wing technologies, certain interactions between them should be considered:

(1) wing volume reduction due to shorter wing chords, affecting the volume available for fuel and—of particular pertinence in joined-wing geometries—cross-shafting;

(2) mast height required for rotor clearance of the front and rear wings;

(3) slight complicating effect of dihedral on cross-shafting; and (4) possible requirement for a canard surface, as in FIGS. 13 through 16, for integrated configurations with unswept front wings.

A canard may required to bring the aerodynamic center forward, so that the cruise static margin is not excessive. This possibility, however, is not peculiar to joined-wing tiltrotors; in fact cantilever tiltrotor configurations with canards have been proposed by NASA. See Kocks, supra. Influence of the canard wake on the rotor must be considered in the rotor design, for configurations with canards.

With regard to rotor clearance, unstaggered joined-wing configurations (such as those in FIGS. 5 through 8) are equal to current cantilever configurations. Staggered configurations (such as those of FIGS. 1 through 4, and FIGS. 9 through 16) may require increased mast height, preconed rotors, or delta-three hinges to obtain adequate clearance. The configurations shown in FIGS. 9 through 16 have a flapping clearance of roughly eight degrees as each rotor blade passes over the rear wing.

A further option is to align the rotor shafts slightly outward in hover. With proper orientation of the nacelle tilting or pivoting axis, the rotor shafts remain parallel to the flight direction in cruise.

Figure 17:
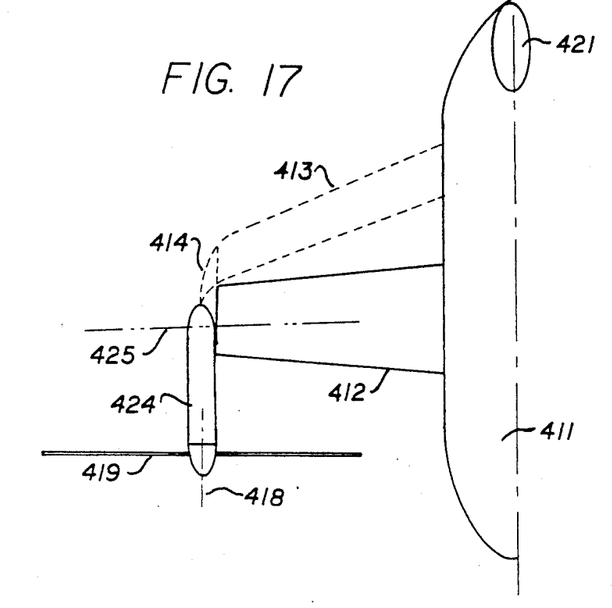
FIG. 17 is a highly diagrammatic right-side-half plan view showing certain details of the rotor deployment in forward flight.
Figure 18:
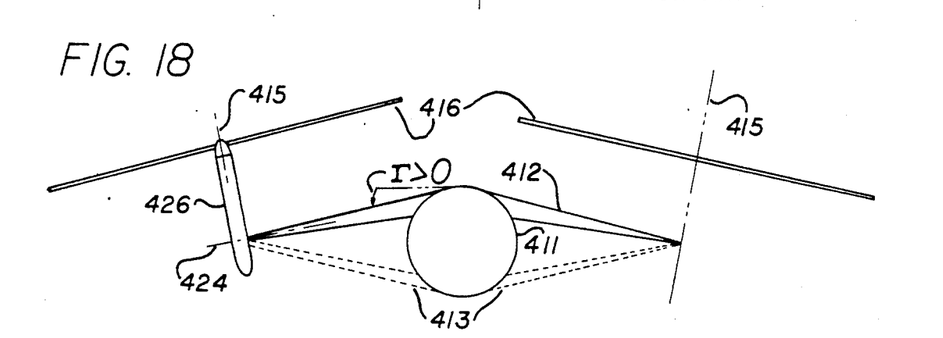
FIG. 18 is a similarly diagrammatic front elevation showing related details of rotor deployment in hovering flight.

More specifically, FIGS. 17 and 18 show a tiltrotor aircraft with the novel feature of a tilted rotor-shaft axis 415, 418. In the hover mode, this axis 415 appears vertical in side view (not shown) but it is tilted in front view (FIG. 18). In cruise, however, the same shaft axis 418 is parallel to the flight path or very nearly so—i.e., essentially horizontal.

This is achieved by locating the tilt axis 424 of the nacelle 426 so that it forms a constant included angle with the shaft axis 415, 418. This angle is preferably but not necessarily ninety degrees.

For ninety degrees, as can be proven by a simple vector-product calculation, the nacelle tilt axis 424 is parallel to the aircraft y-axis, running along the wing—that is, at the wing dihedral angle $\Gamma$ (FIG. 18). This arrangement maximizes rotor flapping clearance, thus permitting shorter nacelles.

Specific aircraft design for successful practice of my invention will require:

(1) selecting the best ways to apply the joined-wing concept to tiltrotors, through a series of configurational studies considering cruise and hover performance—from alternatives such as those illustrated in this document, and others;

(2) estimating the effect of the joined wing on aeroelastic characteristics by analyzing XV-15 and V-22 configurations modified along the lines suggested by (1); and (3) quantifying the expected gains in performance over cantilever-wing tiltrotors.

For step (2), weight and stiffness relations—and other characteristics that will occur to those skilled in the art—may be explored using standard general-purpose structural analysis programs such as NASTRAN and MSC-PAL. Some added efficiency of analysis may be gained, though this is certainly not necessary to eventual completion of the task, by means of specialized programs (whose use is commercially available) such as these:

"JAWS" (Joined Analysis of Wing Structures) is a program developed by my firm, ACA Industries, Inc. of Torrance, Calif. The software computes loads and stresses in joined wings.

Essentially it is a finite-element static structural analysis program, inputted with only a few key parameters. They include span, root and tip chord, dihedral, sweep, airfoil ordinates, and skin-thickness distribution for the front and rear wings. The program includes beam-column effects and tilted principal inertia axes, which as explained in my above-noted paper are significant for joined wings.

"CAMRAD" (Comprehensive Analytical Model for Rotorcraft Aerodynamics and Dynamics) was developed by Dr. Wayne Johnson. It provides trim solutions and rigid and elastic flight dynamics, including coupling between rotor flapping and inplane motions, and wing torsion and bending parallel to both chordwise and vertical axes. A brief summary of CAMRAD is given by Felker and Light, supra.

Johnson has validated it against XV-15 test data and V-22 model test data. Johnson, W., "Assessment of Aerodynamic and Dynamic Models in a Comprehensive Analysis for Rotorcraft," 12A *Comp. & Maths. with Appls.* 11-28 (No. 1, 1986). Johnson, W., "An Assessment of the Capability to Calculate Tilting Prop-Rotor Aircraft Performance, Loads, and Stability," 1984

NASA TP 2291 (March). CAMRAD accepts modal representations of structures; such representations can be generated by MSC-PAL or NASTRAN, after the initial joined-wing design has been done on, e.g., JAWS.

"VORLAT" is an ACA-developed vortex-lattice code, based on the well-known Lamar-Margason codes, which has given excellent agreement with wind-tunnel data on joined-wing and cantilever-wing configurations. With corrections for rotor and fuselage effects from XV-15 data, it can be used to estimate cruise aerodynamic characteristics, such as lift curve slope and aerodynamic center location.

Both civil and military missions should be considered, including forty- to sixty-passenger transports, high-speed JVX escort aircraft with maximum speeds of 350 to 375 knots (100 knots faster than JVX), and, e.g., California Air Corridor projects currently under study at California State Polytechnic University at San Luis Obispo.

In modeling, the cantilever wing (and tail if appropriate) should be replaced by a joined wing selected to match the operational requirements of the baseline aircraft. For example, if the mission emphasizes high-speed performance a configuration similar to that of FIGS. 9 through 12 might be selected, having thin swept wings to delay the compressibility drag rise.

If hover performance is emphasized, the overlapping configuration of FIGS. 5 through 8 might be preferred, to minimize hover thrust losses.

Some special considerations must be taken into account in matching the joined-wing configuration to mission requirements—as noted below.

Minimizing hover download—As indicated in FIG. 21, the hover download is caused partly by direct wing drag, and partly by recirculation and fountain effects. Relative magnitudes of these contributions depend on the thrust coefficient $C_T$.

Felker and Light, supra, have quantified this dependence through a semiempirical theory. Their theory splits the wing into two regions: the outer region lies within a radius Rc (less than the rotor radius R) of the vertical rotor axis.

Rc is a function of $C_T$ varying between 0.4R and 0.6R. The outer region flow determines the direct wing drag; the flow over the rest of the wing determines the fountain download.

For joined wings having little or no sweep, as in FIGS. 5 through 8, the above semiempirical theory should be useful, although corrections for the shielding effect of the upper wing on the lower wing will be required. The benefits of the unstaggered configuration will be greatest for high disc loadings giving large values of Rc.

One would expect direct drag to be minimized by adopting an unstaggered configuration such as the arrangement shown in FIGS. 5 through 8, where the upper wing partially shields the lower wing from the rotor wake. Staggered wings do not offer this benefit, but may have a compensating advantage through reducing the fountain download.

This is possible because, with a swept-wing configuration, such as that of FIGS. 9 through 12, the flows on the upper surfaces of the port and starboard wings do not meet the plane of symmetry at ninety degrees. This may destabilize recirculation, and cause fountain momentum to be directed fore and aft rather than vertically. This possibility is somewhat speculative, and probably quantifiable only through testing.

Realizing low cruise drag—A notable feature of all the joined-wing configurations that have been wind-tunnel tested to date is that they have displayed negligible interference drag at the interwing joint. This is because the wings have been joined in trail, as in FIGS. 1 through 4 and FIGS. 9 through 16.

Figure 5:
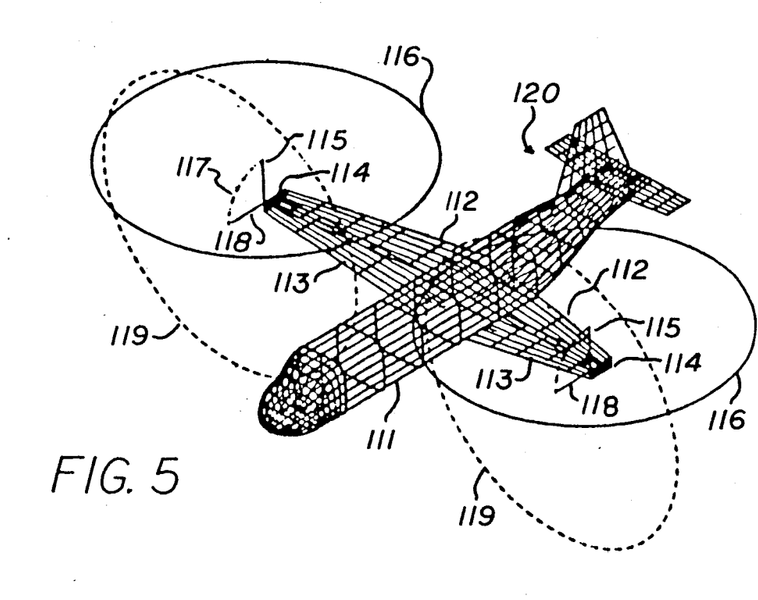
FIG. 5 is a perspective view like FIG. 1, but showing a second preferred embodiment.

Unstaggered wing configurations (FIGS. 5 through 8) may develop interference drag at the joint unless the airfoils are locally modified and/or some vertical gap between the airfoils is retained at the junction of the airfoils and the nacelle. FIGS. 5 and 7 illustrate such a gap.

For the complex aerodynamic effects described above, wind-tunnel tests may be required to obtain reliable data.

In selecting the best joined-wing configuration for a mission, total structural weight of the lifting surfaces should be considered. In hover, these surfaces represent dead weight, which subtracts from potential payload.

Minimizing their total weight reduces hover power, and hence compounds the weight saving. I emphasize that it is the total weight that is important. The unswept configuration of FIGS. 5 through 8 may have a lighter *wing* weight than the swept configuration of FIGS. 9 through 12, but the high degree of structural integration of that configuration may yield a lighter *wing plus tail* weight.

It will be understood that the foregoing disclosure is intended to be merely exemplary, and not to limit the scope of the invention—which is to be determined by reference to the appended claims.

I claim:

1. A hybrid aircraft capable of vertical takeoff and highly efficient hovering flight, and of forward cruising flight at intermediate speeds approaching roughly four hundred knots, and comprising:
   a fuselage;
   self-bracing means for providing aerodynamic lift in forward cruising flight at speeds approaching roughly four hundred knots, and comprising, on each side of the fuselage:
     a first wing, fixed at substantially the bottom of the fuselage, that is substantially unperforated in hovering as well as forward flight, and
     a second wing, fixed at substantially the top of the fuselage, or fixed to structure extending above the fuselage, and likewise substantially unperforated in hovering as well as forward flight;
     each wing having thickness-to-chord ratio less than eighteen percent, and at least one of the first and second wings having dihedral so that the wings converge to join or nearly join at their tips;
   unducted-rotor means for providing aerodynamic lift sufficient for highly efficient hovering flight, and for propelling the aircraft at speeds approaching roughly four hundred knots in forward cruising flight, said lift-and-propelling means being:
     supported on said self-bracing lift means, at or near said tips of the first and second wings,
     pivoted for operation in different orientations in hovering and forward flight respectively, and
     of radius sufficient to extend, when pivoted for operation in forward flight, nearly to the fuselage.

2. The aircraft of claim 1, wherein at each side of the fuselage:

the second wing is angled downward toward its tip; and the lift-and-propelling means comprise rotor blades extending substantially radially from a driveshaft; and in hovering flight the rotor blades operate in rotation about axes that are angled, relative to the vertical, at an angle such that the blades are substantially parallel to the second wing.

3. The aircraft of claim 1, wherein at each side of the fuselage:

at least one of the two wings is backswept toward its tip;

the lift-and-propelling means comprise rotor blades extending substantially radially from a driveshaft, near an end of the driveshaft;

in forward flight the driveshaft is oriented substantially parallel to the direction of flight and is supported for rotation only at positions aft of the forwardmost portion of said at least one backswept wing; and said end of the driveshaft extends forward, from the positions at which driveshaft is supported, far enough that:

the rotor blades clear said at least one backswept wing, and in forward flight, flapping vibration of the wings, induced by air backthrust from the blades, is significantly reduced; and in hovering flight, due to said extension of the end of the driveshaft from the positions at which the driveshaft is supported, flapping download on the wings, induced by air downthrust from the blades, is significantly reduced.

4. The aircraft of claim 1, wherein:

the wings are substantially unstaggered, the first wing being fixed substantially directly below the second wing so that the substantially unperforated second wing partially shields the substantially unperforated first wing from rotor downwash during hovering flight;

whereby, for the first and second wings considered together, the average downloading due to downwash in hover is significantly reduced.

5. The aircraft of claim 1, wherein:

the wings are staggered, the first wing being fixed forward of the second wing;

the lift-and-propelling means comprise rotor blades extending substantially radially from a driveshaft, near an end of the driveshaft;

the lift-and-propelling means further comprise means for supporting the driveshaft for rotation;

the driveshaft-supporting means are oriented in forward flight so that the driveshaft is substantially parallel to the direction of flight;

said end of the driveshaft extends forward, from the driveshaft-supporting means, by a very short distance that is substantially only enough so that the rotor blades adequately clear the driveshaft-supporting means; and each of the two wings is swept slightly forward toward its tip;

whereby the rotor blades also clear both wings, notwithstanding said very short forward extension of the driveshaft.

6. The aircraft of claim 1, wherein:

the wings are staggered, the first wing being fixed forward of the second wing;

the lift-and-propelling means comprise rotor blades extending substantially radially from a driveshaft, near an end of the driveshaft;

the lift-and-propelling means further comprise means for supporting the driveshaft for rotation;

the driveshaft-supporting means are oriented in forward flight so that the driveshaft is substantially parallel to the direction of flight;

neither wing is backswept toward its tip;

said end of the driveshaft extends slightly forward, from the driveshaft-supporting means, far enough so that the rotor blades clear both wings, allowing for flapping of the blades, notwithstanding the fact that neither wing is backswept.

7. The aircraft of claim 1, wherein:

the wings are staggered, the first wing being fixed forward of the second wing;

the first wing is slightly backswept toward its tip;

the lift-and-propelling means comprise rotor blades extending substantially radially from a driveshaft, near an end of the driveshaft;

in forward flight the driveshaft is oriented substantially parallel to the direction of flight and is supported for rotation only at positions aft of the forwardmost portion of said backswept first wing; and said end of the driveshaft extends forward, from the positions at which the driveshaft is supported, so that the rotor blades clear said backswept first wing even allowing for flapping of the rotor blades.

8. The aircraft of claim 1, wherein:

the first wing is backswept at an angle to the direction of flight, and has a chord thickness;

the lift-and-propelling means comprise rotor blades extending substantially radially from a driveshaft, near an end of the driveshaft;

the lift-and-propelling means further comprise means for supporting the driveshaft;

in forward flight the driveshaft-supporting means are oriented substantially parallel to the direction of flight;

said end of the driveshaft extends from the driveshaft-supporting means by a particular distance;

flapping download on the wings in hovering flight, and flapping vibration of the wings in forward flight, both decrease with said particular distance of driveshaft extension;

direct mechanical vibration conveyed from the rotor blades through the driveshaft to the wings, in both hovering and forward flight, increases with said particular distance of driveshaft extension;

resistance to flapping download in hovering flight and to flapping vibration in forward flight increases with said chord thickness;

whereby reliability and useful life of the wings as affected by flapping decrease with said extension distance, and as affected by direct vibration increase with said extension distance; and as affected by both increase with chord thickness;

speed of forward flight increases with said backsweep angle and with the weight of the lift-and-propelling means; and decreases with said chord thickness;

said chord thickness increases with the weight of the lift-and-propelling means;

said particular distance of driveshaft extension increases with said backsweep angle; and said particular distance of driveshaft extension, backsweep angle, chord thickness, and lift-and-propelling-means weight, all considered together, are substantially optimized for speed of forward flight and for reliability and life of the wings.

9. A hybrid aircraft capable of vertical takeoff and highly efficient hovering flight, and of forward cruising flight at intermediate speeds approaching but not exceeding roughly four hundred knots, and comprising:
a fuselage;
self-bracing means for providing aerodynamic lift in forward cruising flight at speeds approaching but not exceeding roughly four hundred knots, and comprising, on each side of the fuselage:
 a first wing, fixed at substantially the bottom of the fuselage, that is substantially unperforated in hovering as well as forward flight, and
 a second wing, fixed at substantially the top of the fuselage, or fixed to structure extending above the fuselage, and likewise substantially unperforated in hovering as well as forward flight;
 each wing having thickness-to-chord ratio less than eighteen percent, and at least one of the first and second wings having dihedral so that the wings converge to join or nearly join at their tips;
unducted-rotor means for providing aerodynamic lift sufficient for highly efficient hovering flight, and for propelling the aircraft at speeds approaching but not exceeding roughly four hundred knots in forward cruising flight, said lift-and-propelling means being:
 supported on said self-bracing lift means, at or near said tips of the first and second wings,
 pivoted for operation in different orientations in hovering and forward flight respectively, and
 of radius sufficient to extend, when pivoted for operation in forward flight, nearly to the fuselage.

10. A hybrid aircraft capable of vertical takeoff and highly efficient hovering flight, and of forward cruising flight at intermediate speeds approaching roughly four hundred knots, and comprising:
a fuselage;
engine means;
self-bracing means for providing aerodynamic lift in forward cruising flight at speeds approaching roughly four hundred knots while supporting the engine means remote from the fuselage, and comprising, on each side of the fuselage:
 a first wing, fixed at substantially the bottom of the fuselage, that is substantially unperforated in hovering as well as forward flight, and
 a second wing, fixed at substantially the top of the fuselage, or fixed to structure extending above the fuselage, and likewise substantially unperforated in hovering as well as forward flight;
 each wing having thickness-to-chord ratio less than eighteen percent, and at least one of the first and second wings having dihedral so that the wings converge to meet or nearly meet at their tips;
unducted-rotor means for providing aerodynamic lift sufficient for hovering flight, and for propelling the aircraft at speeds approaching roughly four hundred knots in forward cruising flight, said lift-and-propelling means being:
 supported on said self-bracing lift-and-supporting means,
 driven in rotation by the engine means,
 pivoted for operation in different orientations in hovering and forward flight respectively, and
 of radius sufficient to extend, when pivoted for operation in forward flight, nearly to the fuselage.

11. The aircraft of claim 10, wherein:
the engine means are supported on said self-bracing lift-and-supporting means at or near the tips of the first and second wings, and pivoted for operation in different orientations in hovering and forward flight respectively; and
the lift-and-propelling means are mounted directly to the engine means, and comprise a driveshaft that is integral with or secured to an output shaft of the engine means.

12. The aircraft of claim 10, wherein at each side of the fuselage:
the second wing is angled downward toward its tip; and
the lift-and-propelling means comprise rotor blades extending substantially radially from a driveshaft; and
in hovering flight the lift-and-propelling means operate in rotation about axes that are angled relative to the vertical at an angle such that the rotor blades are substantially parallel to the second wing.

13. The aircraft of claim 11, wherein at each side of the fuselage:
at least one of the two wings is backswept toward its tip;
the lift-and-propelling means comprise rotor blades extending substantially radially from a driveshaft, near an end of the driveshaft;
in forward flight the driveshaft is oriented substantially parallel to the direction of flight and is supported for rotation only at positions aft of the forwardmost portion of said at least one backswept wing; and
said end of the driveshaft extends forward, from the positions at which driveshaft is supported, far enough that:
 the rotor blades clear said at least one backswept wing, and
 in forward flight, flapping vibration of the wings, induced by air backthrust from the blades, is significantly reduced; and
in hovering flight, due to said extension of the end of the driveshaft from the positions at which the driveshaft is supported, flapping download on the wings, induced by air downthrust from the blades, is significantly reduced;
whereby aerodynamic stress on the wings is reduced, and wings of relatively lower structural strength suffice to support the engine means.

14. The aircraft of claim 10, wherein:
the wings are substantially unstaggered, the first wing being fixed substantially directly below the second wing so that the substantially unperforated second wing partially shields the substantially unperforated first wing from rotor downwash during hovering flight;
whereby, for the first and second wings considered together, the average downloading due to downwash in hover is significantly reduced;
whereby aerodynamic stress on the wings is reduced, and wings of relatively lower structural strength suffice to support the engine means.

15. The aircraft of claim 10, wherein:
the wings are staggered, the first wing being fixed forward of the second wing;

the lift-and-propelling means comprise rotor blades extending substantially radially from a driveshaft, near an end of the driveshaft;

the lift-and-propelling means further comprise means for supporting the driveshaft for rotation;

the driveshaft-supporting means are oriented in forward flight so that the driveshaft is substantially parallel to the direction of flight;

said end of the driveshaft extends forward, from the driveshaft-supporting means, by a very short distance that is substantially only enough so that the rotor blades adequately clear the driveshaft-supporting means; and each of the two wings is swept slightly forward toward its tip;

whereby the rotor blades also clear both wings, notwithstanding said very short forward extension of the driveshaft.

16. The aircraft of claim 10, wherein:

the wings are staggered, the first wing being fixed forward of the second wing;

the lift-and-propelling means comprise rotor blades extending substantially radially from a driveshaft, near an end of the driveshaft;

the lift-and-propelling means further comprise means for supporting the driveshaft for rotation;

the driveshaft-supporting means are oriented in forward flight so that the driveshaft is substantially parallel to the direction of flight;

neither wing is backswept toward its tip;

said end of the driveshaft extends slightly forward, from the driveshaft-supporting means, far enough so that the rotor blades clear both wings, allowing for flapping of the blades, notwithstanding the fact that neither wing is backswept.

17. The aircraft of claim 10, wherein:

the wings are staggered, the first wing being fixed forward of the second wing;

the first wing is slightly backswept toward its tip;

the lift-and-propelling means comprise rotor blades extending substantially radially from a driveshaft, near an end of the driveshaft;

in forward flight the driveshaft is oriented substantially parallel to the direction of flight and is supported for rotation only at positions aft of the forwardmost portion of said backswept first wing; and said end of the driveshaft extends forward, from the positions at which the driveshaft is supported, so that the rotor blades clear said backswept first wing even allowing for flapping of the rotor blades.

18. The aircraft of claim 1, wherein:

at each side of the fuselage, at least one of the first and second wings has thickness-to-chord ratio less than sixteen percent.

19. The aircraft of claim 9, wherein:

at each side of the fuselage, at least one of the first and second wings has thickness-to-chord ratio less than sixteen percent.

20. The aircraft of claim 10, wherein:

at each side of the fuselage, at least one of the first and second wings has thickness-to-chord ratio less than sixteen percent.

* * * * *